United States Patent [19]

Kanai

[11] Patent Number: 5,722,077
[45] Date of Patent: Feb. 24, 1998

[54] MOBILE COMMUNICATION SYSTEM CAPABLE OF EFFECTIVELY USING A RADIO COMMUNICATION CHANNEL

[75] Inventor: Toshihito Kanai, Tokyo, Japan

[73] Assignee: NEC Corporation, Tokyo, Japan

[21] Appl. No.: 619,323

[22] Filed: Mar. 21, 1996

[30] Foreign Application Priority Data

Mar. 22, 1995 [JP] Japan ................................ 7-062819

[51] Int. Cl.$^6$ ................................................ H04Q 7/20
[52] U.S. Cl. .................................... 455/452; 455/453
[58] Field of Search ............................ 455/33.1, 34.1,
455/34.2, 54.1, 54.2, 56.1, 62, 67.1, 422,
450, 453, 464, 509, 517, 524, 515; 379/59–60;
370/321, 329, 337, 442, 347

[56] References Cited

U.S. PATENT DOCUMENTS 5,423,065  6/1995  Pinard ................................ 455/56.1
5,521,904  5/1996  Eriksson et al. ................... 370/337

Primary Examiner—Reinhard J. Eisenzopf
Assistant Examiner—Gertrude Arthur
Attorney, Agent, or Firm—Whitham, Curtis, Whitham & McGinn

[57] ABSTRACT

A cellular type mobile communication system has a service area divided into a plurality of cells and comprises in each of the cells a base station for selecting a selected one of first through N-th radio channels as a radio communication channel to carry out bidirectional communication between the base station and a mobile station, where N represents a positive integer which is greater than one. The base station comprises a management memory for memorizing first through N-th traffic amounts on the first through the N-th radio channels, respectively. The first through the N-th traffic amounts are monitored by first through N-th monitoring sections, respectively. A CPU selects the radio communication channel from the first through the N-th radio channels in accordance with the first through the N-th traffic amounts.

6 Claims, 8 Drawing Sheets

| SLOT NUMBER | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| DOWN LINK CHANNEL | A | A | A | B | B | B | B | E | C | C | E | A | A | A |
| UP LINK CHANNEL | E | E | E | E | A | E | E | E | B | E | E | C | E | E |

FIG. 4

| SLOT NUMBER | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| DOWN LINK CHANNEL | A | A | A | B | B | B | B | C | E | D | A | A | A | E |
| UP LINK CHANNEL | C | C | C | C | A | D | D | D | B | E | C | C | C | D |

FIG. 6

MOBILE COMMUNICATION SYSTEM CAPABLE OF EFFECTIVELY USING A RADIO COMMUNICATION CHANNEL

BACKGROUND OF THE INVENTION

This invention relates to a cellular type mobile communication system.

For a large-capacity mobile communication system, such as an automobile telephone network system, a service area is composed of a plurality of radio zones each of which will be called a cell. A base station is located in each of the cells and establishes a radio communication channel to carry out a bidirectional communication with a mobile station. The radio communication channel may be selectively used as up and down links. The up link is for use in communication from the mobile station to the base station. The down link is for use in communication from the base station and the mobile station. On carrying out the bidirectional communication with the mobile station, the base station selects a selected one of a plurality of radio channels as the radio communication channel in a manner known in the art.

In the mobile communication system, data communication may be carried out between the base station and the mobile station. Through the up link of the radio communication channel, the mobile station may access a computer system which is connected to the base station through a public telephone or data communication network. Through the down link of the radio communication channel, the base station gives the mobile station data information which is transmitted from the computer system.

In the above-mentioned data communication, the data information is carried on only the down link of the radio communication channel. Therefore, traffic greatly increases in the down link in comparison with the up link. The traffic is light in the up link. In other words, the up link is not effectively used in the radio communication channel.

On the other hand, facsimile information is given from the mobile station to the base station through the up link of the radio communication channel in order to transmit the facsimile information to the public telephone or the data communication network. In this case, the traffic greatly increases in the up link in comparison with the down link. The traffic is light in the down link. In other words, the down link is not effectively used in the radio communication channel.

As readily understood from the above description, it is difficult to effectively use the radio communication channel in the mobile communication system.

SUMMARY OF THE INVENTION

It is therefore an object of this invention to provide a mobile communication system capable of effectively using a radio communication channel.

Other objects of this invention will become clear as the description proceeds.

On describing the gist of this invention, it is possible to understand that a mobile communication system of a cellular type has a service area divided into a plurality of cells and comprises in each of the cells a base station for selecting a selected one of first through N-th radio channels as a radio communication channel to carry out bidirectional communication between the base station and a mobile station, where N represents a positive integer which is greater than one.

According to this invention, the base station comprises memory means for memorizing first through N-th communication amounts which are representative of communication amounts between the base station and the mobile station in the first through the N-th radio channels, respectively, and selecting means for selecting the radio communication channel from the first through the N-th radio channels in accordance with the first through the N-th communication amounts.

BRIEF DESCRIPTION OF THE DRAWINGS

FIG. 4 is a diagram for use in describing an employment condition of a radio communication channel in a conventional radio communication system;

FIG. 6 is a diagram for use in describing an employment condition of a radio communication channel on using the operation described in FIG. 5;

DESCRIPTION OF THE PREFERRED EMBODIMENTS

Figure 1:
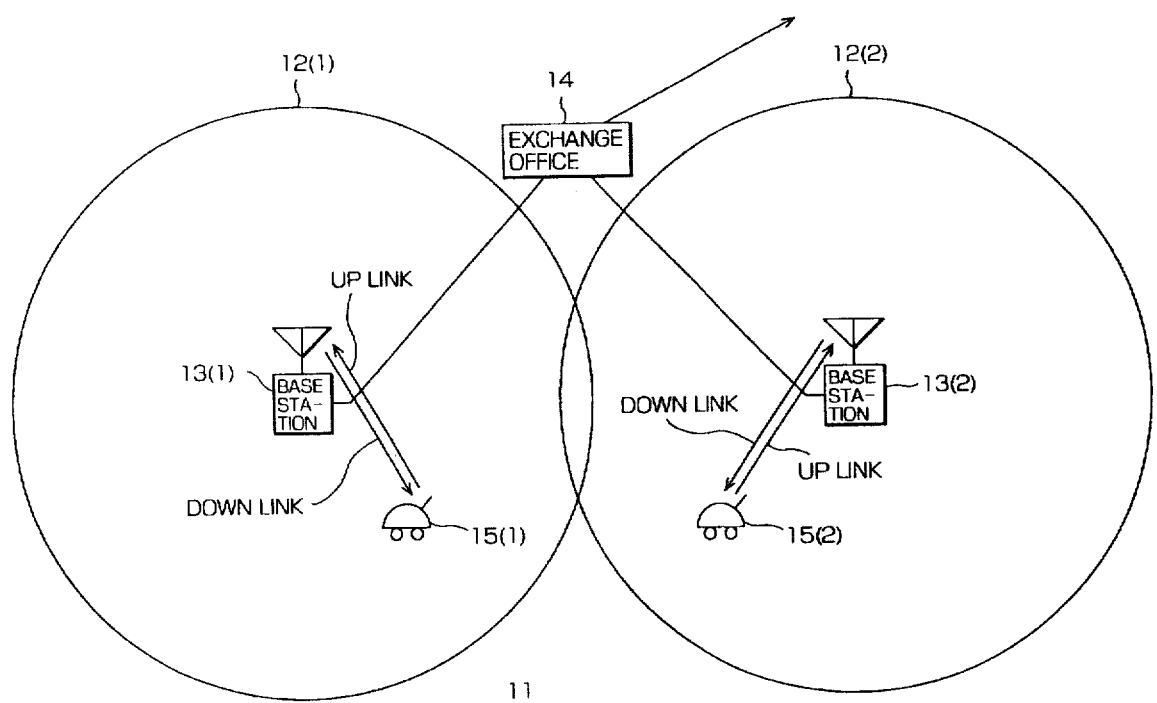
FIG. 1 is a diagram for use in describing a mobile communication system according to a preferred embodiment of this invention.

Referring to FIG. 1, attention will be directed to a mobile communication system of a cellular type. The illustrated mobile communication system has a service area 11. Inasmuch as the mobile communication system is of the cellular type, the service area 11 is divided into a plurality of cells, such as first and second cells 12(1) and 12(2). In the example being illustrated, the cells 12 (suffixes omitted) are circular in shape and partly overlap on one another.

The mobile communication system comprises a plurality of base stations, such as first and second base stations 13(1) and 13(2). In the illustrated example, the base stations 15 (suffixes omitted) are individually situated in the cells 12 as cell sites. Each of the base stations 13 is depicted as having an omnidirectional antenna. The base stations 13 are connected to a switching or exchange office 14 of a public communication network.

A plurality of mobile stations, such as first and second mobile stations 15(1) and 15(2), are movable in the service area 11. In FIG. 1, the mobile stations 15 (suffixes omitted) are depicted as automobiles. Each of the mobile stations 15 is therefore a telephone substation installed on an automobile. Alternatively, each of the mobile stations 15 may be either a portable radio telephone set or a telephone and data terminal equipment installed on a mobile vehicle. Each of the mobile stations 15 may be stationary in one of the cells 12 or may move from one of the cells 12 to another cell 12. In the example being illustrated, the first and the second mobile stations 15 are currently present in the first and the second cells 12.

In each of the cells 12, the base station 13 exchanges communication with the mobile station or stations 15 which are currently present in the cells 12 under consideration.

In each of the cells 12, each base station 13 has first through N-th radio channels, where N represents a positive integer which is greater than one. The first through the N-th radio channels are used as radio control and communication channels. Furthermore, each of the first through the N-th radio channels may be used as either an up link channel or a down link channel. The up link channel is for use in transmission from each mobile station 15 to each base station 13. The down link channel is for use in transmission from each base station 13 to each mobile station 15. On carrying out communication with the each mobile station 15, the each base station 13 assigns a radio channel to each mobile station 15 as will be later described.

Figure 2:
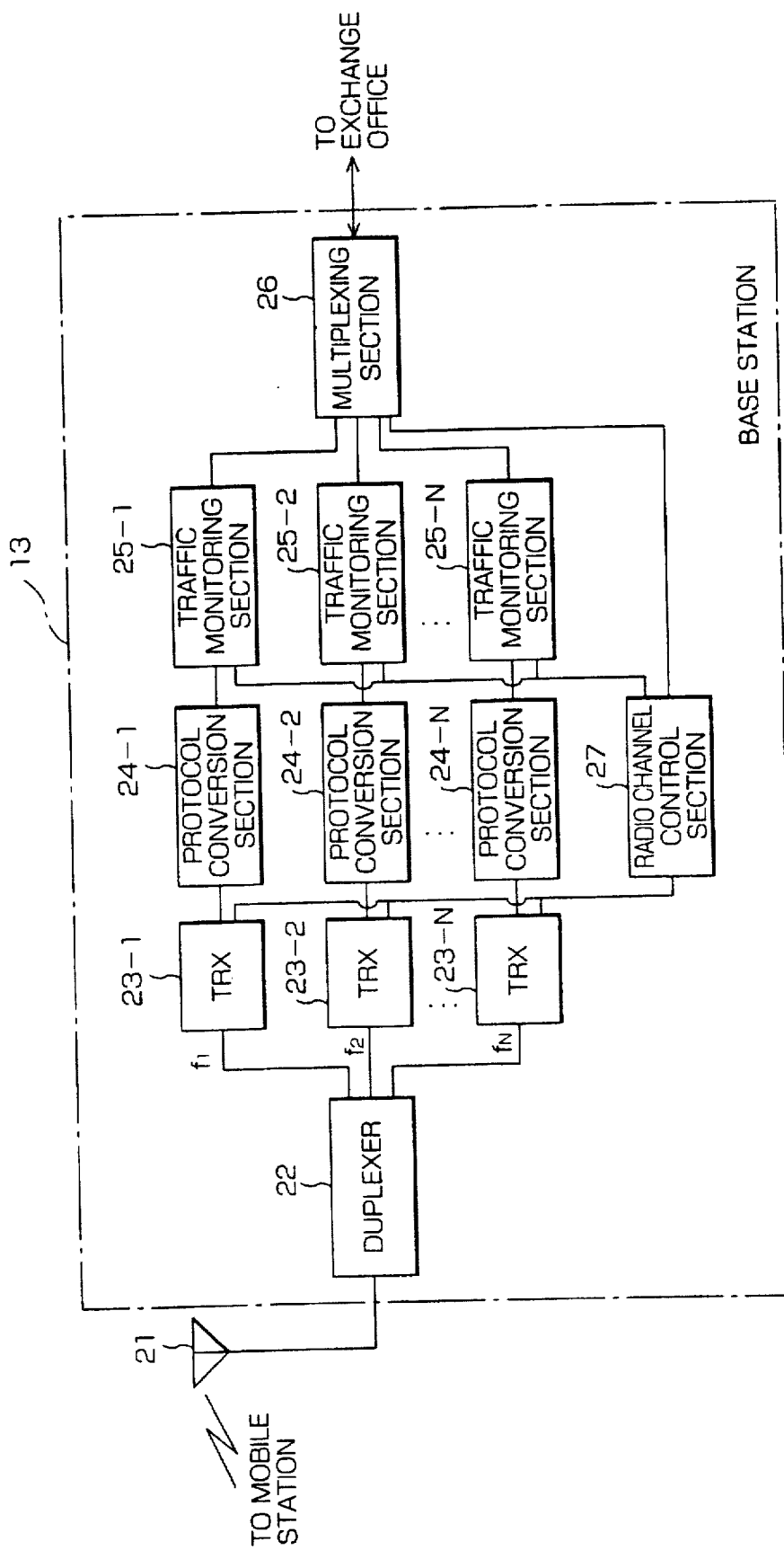
FIG. 2 is a block diagram of a base station illustrated in FIG. 1.

Referring to FIG. 2, attention will be directed to each base station 13. Each base station 13 comprises an antenna 21, a duplexer 22, first through N-th transmitter-receivers (TRX) 23-1 to 23-N similar in function to one another, first through N-th protocol conversion sections 24-1 to 24-N similar in function to one another, first through N-th traffic monitoring sections 25-1 to 25-N similar in function to one another, a multiplexing section 26 and a radio channel control section 27 for controlling the first through N-th transmitter-receivers 23-1 to 23-N and the multiplexing section 26. Each of the first through the N-th transmitter-receivers 23-1 to 23-N is connected to the antenna 21 through the duplexer 22.

It will be assumed that the first through the N-th transmitter-receivers 23-1 to 23-N transmit first through N-th transmission signals each of which has a plurality of transmission slots. Furthermore, it will be assumed that the first through the N-th transmitter-receivers 23-1 to 23-N receive first through N-th reception signals each of which has a plurality of reception slots.

The first transmission signal is carried by a first radio channel of a radio frequency f1 that is used as the first down link channel. The first reception signal is carried by the first radio channel which is used as the first up link channel. The second transmission signal is carried by a second radio channel of a radio frequency f2 that is used as the second down link channel. The second reception is carried by the second radio channel which is used as the second up link channel. Similarly, the N-th transmission signal is carried by an N-th radio channel of a radio frequency fN that is used as the N-th down link channel. The N-th reception signal is carried by the N-th radio channel which is used as the N-th up link channel.

Attention will be directed to the first transmitter-receiver 23-1. When the first transmitter-receiver 23-1 receives the first transmission signal, the first transmitter-receiver 23-1 demodulates the first transmission signal into a first demodulated signal which is supplied to the first protocol conversion section 24-1. The first demodulated signal is subjected to a protocol conversion in the first protocol conversion section 24-1 to be converted into a first demodulated conversion signal.

The first traffic monitoring section 25-1 monitors a traffic amount in the first demodulated conversion signal. Inasmuch as the first reception signal is carried by the first up link channel in case where the first radio channel is used as the first up link channel, the first traffic monitoring section 25-1 substantially monitors the traffic amount of the first up link channel. The first traffic monitoring section 25-1 supplies the radio channel control section 27 with a first up link monitored signal which is representative of the traffic amount of the first up link channel.

When the second through the N-th transmitter-receivers 23-2 to 23-N receive the second through the N-th reception signals, the second through the N-th transmitter-receivers 23-2 and 23-N demodulate the second through the N-th reception signals into second through N-th demodulated signals, respectively. The second through the N-th demodulated signals are subjected to a protocol conversion in the second through the N-th protocol conversion sections 24-2 to 24-N to be converted into second through N-th demodulated conversion signals, respectively.

Supplied with the second through the N-th demodulated conversion signals, the second through the N-th traffic monitoring sections 25-2 and 25-N supply the radio channel control section 27 with second through N-th up link monitored signals which are representative of the traffic amounts of the second through the N-th up link channels, respectively. The traffic amounts of the first through the N-th up link channels may be called first through N-th up link traffic amounts, respectively.

Each of the first through the N-th demodulated conversion signals are supplied to the multiplexing section 26. The multiplexing section 26 multiplexes the first through the N-th demodulated conversion signals to produce a transmission multiplexed signal which is transmitted to the exchange office 14 (FIG. 1).

On the other hand, the multiplexing section 26 may receive a multiplexed signal as a reception multiplexed signal from the exchange office 14 (FIG. 1). The multiplexing section 26 demultiplexes the reception multiplexed signal to produce first through N-th demultiplexed signals each of which has a plurality of slots.

The first through the N-th demultiplexed signals are delivered to the first through the N-th traffic monitoring sections 25-1 to 25-N, respectively. The first through the N-th traffic monitoring sections 25-1 to 25-N monitor the first through the N-th demultiplexed signals to produce first through N-th down link monitored signals, respectively, as will be later described. The first through the N-th down link monitored signals are supplied to the radio channel control section 27.

The first through the N-th demultiplexed signals are supplied to the first through the N-th protocol conversion sections 24-1 to 24-N to be subjected to the protocol conversion. The first through the N-th protocol conversion sections 24-1 to 24-N supply first through N-th demultiplexed conversion signals to the first through the N-th transmitter-receivers 23-1 to 23-N, respectively.

The first through the N-th transmitter-receivers 23-1 to 23-N modulate the first through the N-th demultiplexed conversion signals into first through N-th modulated signals, respectively. From the antenna 21, the first through the N-th modulated signals are transmitted as the first through the N-th transmission signals through duplexer 22.

As readily understood from the above description, the first through the N-th demultiplexed signals are carried by first through the N-th down link channels, respectively. Accordingly, the above-mentioned first through N-th down link monitored signals are representative of the traffic amounts of the first through the N-th down link channels, respectively. The traffic amounts of the first through the N-th down link channels may be called first through N-th down link traffic amounts, respectively.

Figure 3:
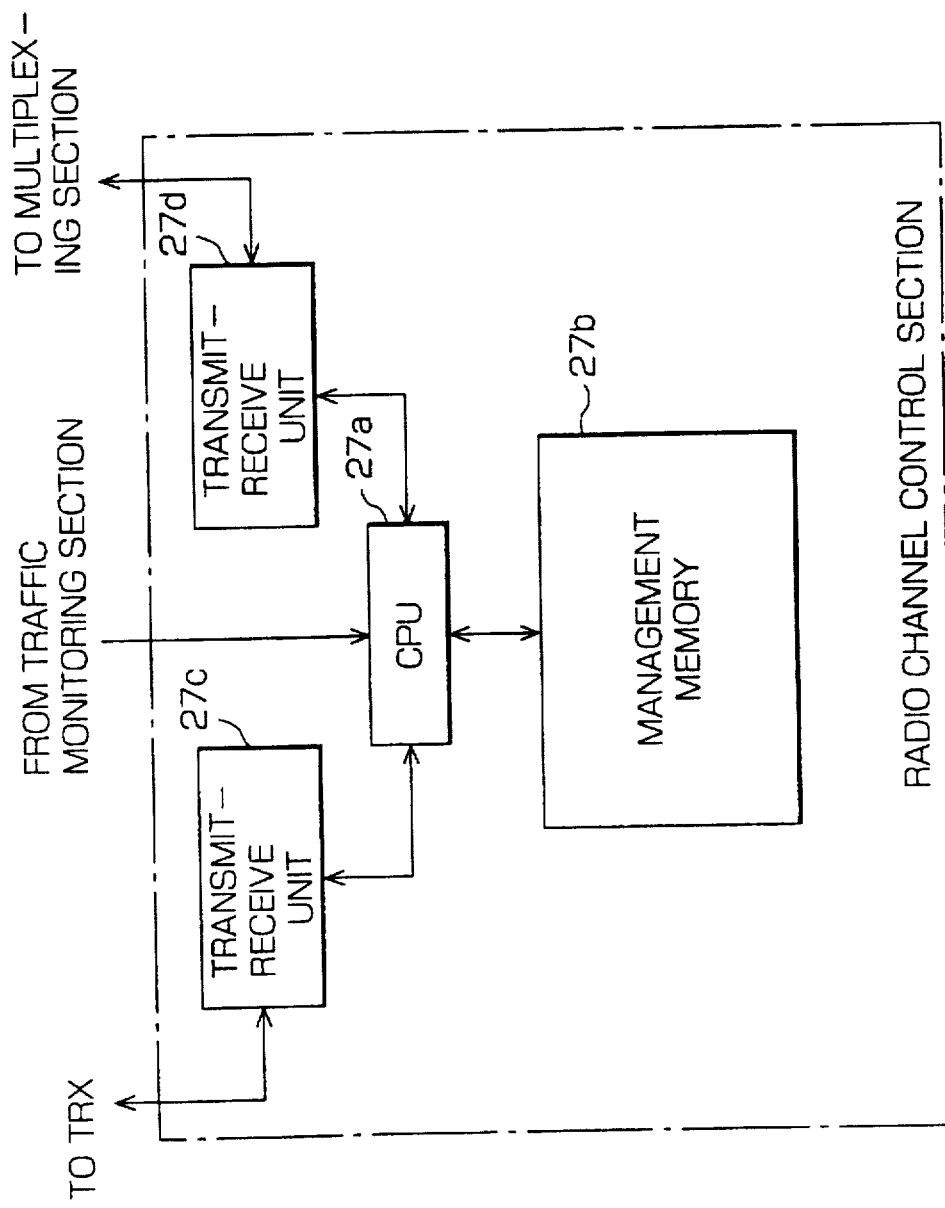
FIG. 3 is a block diagram of a radio channel control device for use in the base station illustrated in FIG. 2.

Referring to FIG. 3, the radio channel control section 27 comprises a central processing unit (CPU) 27a, a management memory 27b, and first and second transmit-receive units 27c and 27d. The first transmit-receive unit 27c is connected to the first through the N-th transmitter-receivers 23-1 to 23-N (FIG. 2). The second transmit-receive unit 27d is connected to the multiplexing section 26 (FIG. 2).

Referring to FIGS. 1 to 3, each mobile station 15 transmits a call signal as a mobile call signal to the base station 13 by using a control channel as known in the art on communicating with public communication network. The control channel may be, for example, one of the first through the N-th radio channels. The mobile call signal is received by one of the first through the N-th transmitter-receivers 23-1 to 23-N to be supplied to the first transmit-receive unit 27c. Responsive to the mobile call signal, the first transmit-receive unit 27c informs the CPU 27a of a mobile call or transmission. Responsive to the mobile call, the CPU 27a selects or assigns one of the first through the N-th radio channels as a selected up link channel as will be later described.

The exchange office 14 may transmit a call signal as an exchange call signal to the base station 13 on communicating with the first mobile station 15(1). The exchange call signal is received by the second transmit-receive unit 27d through the multiplexing section 26. Responsive to the exchange call signal, the second transmit-receive unit 27d informs the CPU 27a of an exchange call or transmission. Responsive the exchange call, the CPU 27a selects or assigns one of the first through the third radio channels as a selected down link channel as will be later described.

The management memory 27b may be for memorizing communication management information having mobile call information and exchange call information. The mobile call information is representative of the number of communications at each of the first through the N-th radio channels on the mobile call. The exchange call information is representative of the number of communications at each of the first through the N-th radio channels on the exchange call.

As described above, the radio channel control section 27 is supplied with the first through the N-th up link and down link monitored signals. Responsive to these monitored signals, the CPU 27a may store the first through the N-th up link and down link traffic amounts in the management memory 27b.

Referring to FIG. 4, it will be assumed that three mobile stations communicate with the base station 13 by one up link channel and one down link channel. In FIG. 4, slots are assigned to three mobile stations in each of the up link and down link channels in accordance with Slot-Aloha fashion. Each of labels "A" to "C" is representative of a mobile station. A label "E" is representative of an empty slot which is assigned to no mobile station.

In the down link channel, the first through the third and the twelfth through the fourteenth slots are used for data transmission from the base station to the mobile station "A". The fourth through the seventh slots are used for data transmission from the base station to the mobile station "B". The ninth and tenth slots are used for data transmission from the base station to the mobile station "C".

In the up link channel, the fifth, ninth, and twelfth slots are used for data transmission from the mobile stations "A", "B", and "C" to the base station, respectively.

As readily understood from FIG. 4, the traffic is heavy in the down link channel in comparison with the up link channel. Namely, the up link channel has a number of empty slots.

Figure 5:
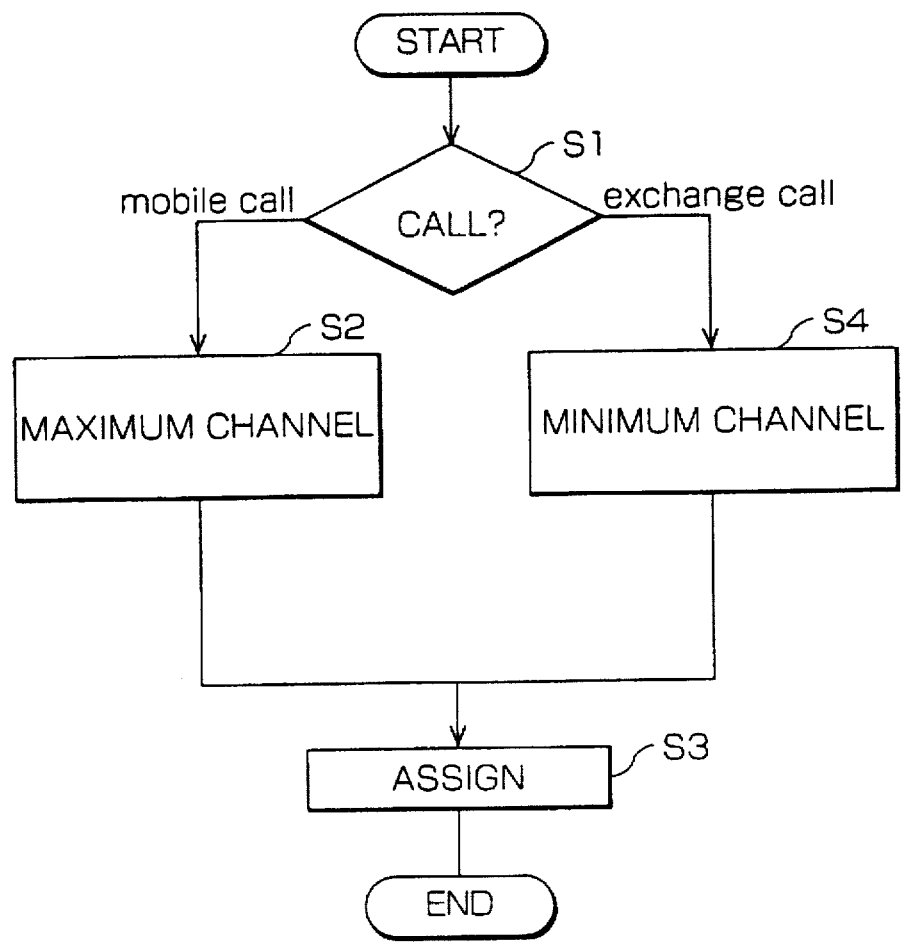
FIG. 5 is a flow chart for use in describing an operation of the radio channel control device illustrated in FIG. 3.

Referring to FIG. 5 in addition to FIGS. 2 and 3, description will proceed to an operation of the radio channel control section 27. As described above, the management memory 27b memorizes the communication management information. When the call signal is received, the CPU 27a judges that the call signal is representative of the mobile call or the exchange call at a first step S1 labelled "CALL". When the call signal is representative of the mobile call, the CPU 27a carries out a second step S2 labelled "MAXIMUM CHANNEL". in the second step S2, the CPU 27a accesses the management memory 27b to read the communication management information out of the management memory 27b. The CPU 27a selects a selected one of the first through the N-th radio channels as a first selected radio channel in accordance with the communication management information.

More particularly, the CPU 27a selects the selected one of the first through the N-th radio channels that has a maximum difference (relative value) between the number of exchange calls and the number of mobile calls. Namely, the CPU 27a selects the selected one of the first through the N-th radio channels that has the most free up link channel between the first through the N-th radio channels.

In order to assign the first selected channel to the mobile station which carries out the mobile call, the CPU 27a produces a first channel select signal which is representative of the first selected radio channel and which is supplied to the first transmit-receive unit 27c in a third step S3 labelled "ASSIGN".

Through the control channel, the base station 13 gives the channel select signal to the mobile station 15 which carries out the mobile call. The mobile station 15 carries out the communication with the exchange office through the first selected channel.

When the call signal is representative of the exchange call in the first step S1, the CPU 27a carries out a fourth step S4 labelled "MINIMUM CHANNEL". In the fourth step S4, the CPU 27a accesses the management memory 27b to read the communication management information out of the management memory 27b. The CPU 27a selects a selected one of the first through the N-th radio channels as a second selected radio channel in accordance with the communication management information.

More particularly, the CPU 27a selects the selected one of the first through the N-th radio channels that has a minimum difference (relative value) between the number of exchange calls and the number of the mobile calls. Namely, the CPU 27a selects the selected one of the first through the N-th radio channels that has the most free down link channel of between the first through the N-th radio channels.

The CPU 27a produces a second channel select signal which is representative of the second selected radio channel and which is supplied to the first transmit-receive unit 27c in the third step S3. Through the control channel, the base station 13 gives the second channel select signal to the mobile station 15 which the exchange office wants the communication by the exchange call. The mobile station 15 carries out communication with the exchange office through the second selected radio channel.

When the CPU 27a selects a selected one of the first through the N-th radio channels as described above, it is possible to effectively use the up and the down link channel in the selected radio Channel as shown in FIG. 6. More specifically, it is possible to effectively use the up and the down link channels in the selected radio channel on carrying out data communication.

In FIG. 6, slots are assigned to three mobile stations in each of the up and the down link channels in accordance with Slot-Aloha fashion. Each of labels "A" to "C" is representative of the slot assigned to the mobile station. A label "E" is representative of an empty slot assigned to no mobile station.

Figure 7:
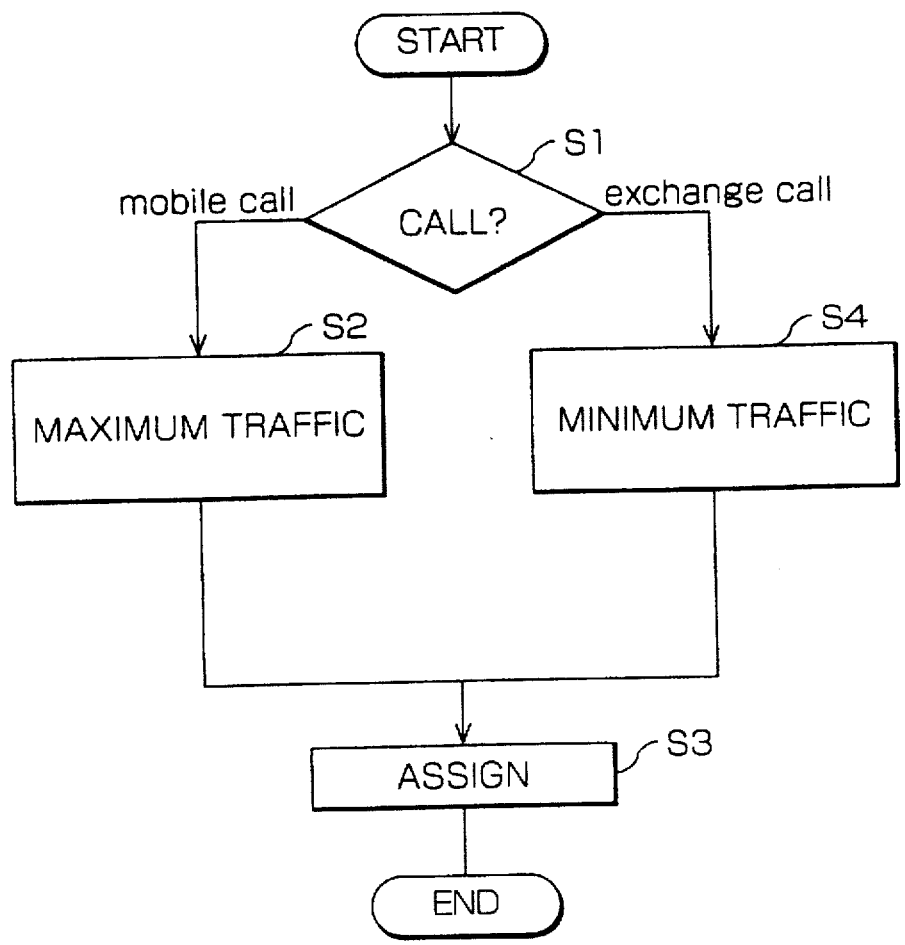
FIG. 7 is a flow chart for use in describing another operation of the radio channel control device illustrated in FIG. 3.

Referring to FIG. 7 in addition to FIGS. 2 and 3, description will proceed to another operation of the radio channel control section 27. As described above, the radio channel control section 27 is supplied with the first through the N-th up link and down link monitored signals. When the call signal is received, the CPU 27a judges that the call signal is representative of the mobile call or the exchange call at a first step S1 labelled "CALL".

When the call signal is representative of the mobile call, the CPU 27a carries out a second step S2 labelled "MAXIMUM TRAFFIC". In the second step S2, the CPU 27a selects a selected one of the first through the N-th radio channels as a first selected radio channel in accordance with the first through the N-th up link and down link traffic amounts.

More particularly, the CPU 27a compares the first through the N-th up link traffic amounts with the first through the N-th down link traffic amounts, respectively, to select a selected one of the first through the N-th radio channels that has a maximum traffic difference (relative value) among the first through the N-th radio channels. Namely, the CPU 27a selects the selected one of the first through the N-th radio channels that has the most free up link channel between the first through the N-th radio channels.

In order to assign the first selected channel to the mobile station which carries out the mobile call, the CPU 27a produces a first channel select signal which is representative of the first selected radio channel and which is supplied to the first transmit-receive unit 27c in a third step S3 labelled "ASSIGN".

Through the control channel, the base station 13 gives the first channel select signal to the mobile station 15 which carries out the mobile call. The mobile station 15 carries out the communication with the exchange office through the first selected channel.

When the call signal is representative of the exchange call in the first step S1, the CPU 27a carries out a fourth step S4 labelled "MINIMUM TRAFFIC". In the fourth step S4, the CPU 27a selects a selected one of the first through the N-th radio channels as a second selected radio channel in accordance with the first through the N-th up link and down link traffic amounts.

More particularly, the CPU 27a compares the first through the N-th up link traffic amounts with the first through the N-th down link traffic amounts, respectively, to select a selected one of the first through the N-th radio channels that has a minimum traffic difference (relative value) among the first through the N-th radio channels. Namely, the CPU 27a selects the selected one of the first through the N-th radio channels that has the most free down link channel between the first through the N-th radio channels.

In order to assign the second selected channel to the mobile station which carries out the mobile call, the CPU 27a produces a second channel select signal which is representative of the second selected radio channel and which is supplied to the first transmit-receive unit 27c in the third step S3.

Through the control channel, the base station 13 gives the second channel select signal to the mobile station 15 which carries out the mobile call. The mobile station 15 carries out the communication with the exchange office through the second selected channel.

Figure 8:
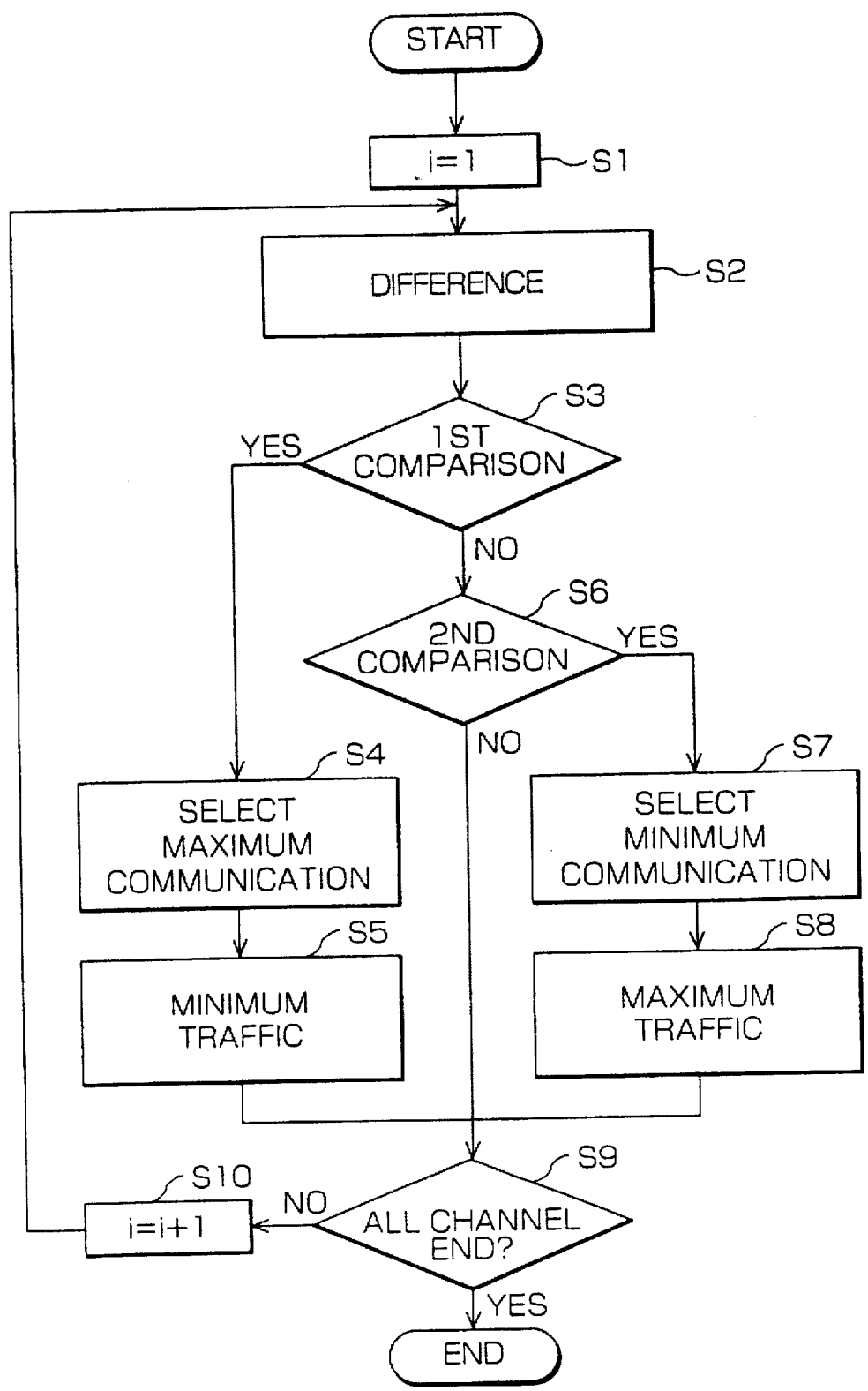
FIG. 8 is a flow chart for use in describing still another operation of the radio channel control device illustrated in FIG. 3.

Referring to FIG. 8 in addition to FIGS. 2 and 3, description will proceed to still another operation of the radio channel control section 27. As described above, the radio channel control section 27 is supplied with the first through the N-th up link and down link monitored signals. The radio channel control section 27 may periodically select a selected one of the first through the N-th radio channels in accordance with the first through the N-th up link and the down link traffic amounts.

When a radio channel selection starts, the CPU 27a sets i=1 therein at a first step S1, where i is variable between 1 and N, both inclusive. After the CPU 27a sets i=1 therein, the the CPU 27a compares the first up link traffic amount with the first down link traffic amount in the first radio channel to calculate a first traffic difference (relative value) between the first up link traffic amount and the first down link traffic amount at a second step S2 labelled "DIFFERENCE". The CPU 27a compares the first traffic difference with a first predetermined threshold value at a third step S3 labelled "FIRST COMPARISON". When the first traffic difference is greater than the first predetermined threshold value, the CPU 27a carries out a fourth step S4 labelled "SELECT MAXIMUM COMMUNICATION".

It will be assumed that first through K-th communications are carried out between first through K-th mobile stations and the base station by using the first radio frequency, respectively, where K represents a positive integer which is greater than one. Furthermore, it will be assumed that the first through the K-th communications have first through K-th up link communication traffic amounts and first through K-th down link traffic amounts, respectively.

In the fourth step S4, the CPU 27a compares the first through the K-th up link communication traffic amounts with the first through the K-th down link traffic amounts, respectively, to calculate first through K-th communication traffic differences (relative values). The CPU 27a determines a maximum one of the first through the K-th communication traffic differences as a maximum traffic difference (relative value). The CPU 27a selects as a maximum traffic communication a selected one of the first through the K-th communications that has the maximum communication traffic difference.

The fourth step S4 is followed by a fifth step S5 labelled "MINIMUM TRAFFIC". In the fifth Step S5, the CPU 27a calculates first through N-th traffic differences (relative values) between the first through the N-th up link traffic amounts and the first through the N-th down link traffic amounts. The CPU 27a determines minimum one of the first through the N-th traffic difference as a minimum traffic difference (relative value). The CPU 27a selects as a selected radio channel a selected one of the first through the N-th radio channels that has the minimum traffic difference. The CPU 27a assigns the selected radio channel to the selected communication having the maximum communication traffic difference.

When the first traffic difference is not greater than the first predetermined threshold value in the third step S3, the CPU 27a carries out a sixth step S6 labelled "SECOND COMPARISON". In the sixth step S6, the CPU 27a judges whether or not the first traffic difference is greater than a second predetermined threshold value. When the first traffic difference is not greater than a second predetermined threshold value, the sixth step S6 is followed by a seventh step S7 labelled "SELECT MINIMUM COMMUNICATION".

In the seventh step S7, the CPU 27a compares the first through the K-th up link communication traffic amounts with the first through the K-th down link communication traffic amounts, respectively, to calculate first through K-th communication traffic differences (relative values). The CPU 27a determines a minimum one of the first through the K-th communication traffic differences as a minimum communication traffic difference (relative value). The CPU 27a selects as a minimum traffic communication a selected one of the first through the K-th communications that has the minimum communication traffic difference.

The seventh step S7 is followed by an eighth step S8 labelled "MAXIMUM TRAFFIC". In the eighth step S8, the CPU 27a calculates first through N-th traffic differences (relative values) between the first through the N-th up link traffic amounts and the first through the N-th down link traffic amounts. The CPU 27a determines a maximum one of the first through the N-th traffic difference as a maximum traffic difference (relative value). The CPU 27a selects as a selected radio channel a selected one of the first through the N-th radio channels that has the maximum traffic difference. The CPU 27a assigns the selected radio channel to the selected communication having the minimum communication traffic difference.

After each of the fifth and the eighth steps S5 and S8, the CPU 27a carries out a ninth step S9 labelled "ALL CHANNEL END". Furthermore, the ninth step S9 is carried out when the first traffic difference is greater than the second predetermined threshold value.

In the ninth step S9, the CPU 27a judges whether or not the above-mentioned selection operation has been carried out in concern with all of the first through the N-th radio channels. When the selection operation has not been carried out in concern with all of the first through the N-th radio channels, the CPU 27a sets i=i+1 therein at a tenth step S10. The tenth step is followed by the second step S2.

When the selection operation has been carried out in concern with all of the first through the N-th radio channels, the selection operation comes to an end.

What is claimed is:

1. A cellular type mobile communication system having a service area divided into a plurality of cells and comprising, in each of said cells, a base station for selecting a selected one of first through N-th radio channels as a radio communication channel to carry out bidirectional communication between said base station and a mobile station, where N comprises a positive integer greater than one, each of said first through said N-th radio channels being selectively used as either one of an up link channel and a down link channel, said up link channel being used in a communication directed from said mobile station to said base station, said down link channel being used in a communication directed from said base station to said mobile station, said base station comprising:

memory means for memorizing first through N-th communication amounts representative of communication amounts between said base station and said mobile station in said first through said N-th radio channels, respectively, said first through said N-th communication amounts having first through N-th up link and down link communication amounts;

detecting means for detecting whether a call signal is representative of a mobile call on starting communication, said detecting means producing a first detection signal when said call signal is representative of said mobile call, otherwise said detecting means producing a second detection signal;

first means responsive to any one of said first and said second detection signals for accessing said memory means to read said first through said N-th communication amounts out of said memory means;

second means for calculating first through N-th difference amounts between said first through said N-th up link communication amounts and said first through said N-th down link communication amounts, respectively; and third means responsive to said first detection signal for detecting a maximum one of said first through said N-th difference amounts to select said radio communication channel from said first through said N-th radio channels that has said maximum difference amount, said third means being responsive to said second detection signal for detecting a minimum one of said first through said N-th difference amounts to select said radio communication channel from said first through said N-th radio channels that has said minimum difference amount.

2. A mobile communication system as claimed in claim 1, wherein each of said first through said N-th communication amounts is representative of the number of communications.

3. A mobile communication system as claimed in claim 1, wherein said selecting means further comprises monitoring means for monitoring said first through said N-th radio channels to produce first through N-th traffic amounts in said first through said N-th radio channels, respectively, to store said first through said N-th traffic amounts as said first through said N-th communication amounts in said memory means.

4. A cellular type mobile communication system having a service area divided into a plurality of cells and comprising, in each of said cells, a base station for selecting a selected one of first through N-th radio channels as a radio communication channel to carry out bidirectional communication between said base station and a mobile station, where N comprises a positive integer greater than one, each of said first through said N-th radio channels being selectively used as either one of an up link channel and a down link channel, said up link channel being used in a communication directed from said mobile station to said base station, said down link channel being used in a communication directed from said base station to said mobile station, each of said first through said N-th radio channels having a plurality of slots selectively assigned to said mobile station, said base station comprising:

memory means for memorizing first through N-th communication amounts representative of communication amounts between said base station and said mobile station in said first through said N-th radio channels, respectively, said first through said N-th communication amounts having first through N-th up link and down link communication amounts;

monitoring means for monitoring said first through said N-th radio channels to produce first through N-th traffic amounts in said first through said N-th radio channels, respectively, to store said first through said N-th traffic amounts as said first through said N-th communication amounts in said memory means;

first means for accessing said memory means to calculate an i-th difference amount between an i-th up link communication amount and an i-th down link communication amount, where i is a variable from 1 to N;

second means for detecting whether said i-th difference amount is greater than a predetermined threshold value to produce a first detection signal when said i-th difference amount is greater than said first predetermined threshold value;

third means responsive to said first detection signal for detecting a communication having a maximum communication traffic in said i-th radio channel as a maximum communication; and fourth means for detecting a minimum one of said first through said N-th difference amounts to select said radio communication channel from said first through said N-th radio channels that has said minimum difference amount, said fourth means assigning said radio communication channel to said maximum communication.

5. A mobile communication system as claimed in claim 4, wherein:

said second means producing a second detection signal when said i-th difference amount is not greater than said first predetermined threshold value;

said selecting means further comprising:

fifth means for detecting for detecting whether or not said i-th difference amount is less than a second predetermined threshold value to produce a third detection signal when said i-th difference amount is less than said second predetermined threshold value.

6. A mobile communication system as claimed in claim 5, wherein said selecting means further comprises:

sixth means responsive to said third detection signal for detecting a communication having a minimum communication traffic in said i-th radio channel as a minimum communication; and seventh means for detecting a maximum one of said first through said N-th difference amounts to select said radio communication channel from said first through said N-th radio channels that has said maximum difference amount, said seventh means assigning said radio communication channel to said minimum communication.

\* \* \* \* \*